(12) United States Patent
Hadwiger et al.

(10) Patent No.: US 6,895,459 B2
(45) Date of Patent: May 17, 2005

(54) BUS ARBITRATION METHOD EMPLOYING A TABLE OF SLOTS SUITABLY DISTRIBUTED AMONGST BUS MASTERS

(75) Inventors: Rainer R. Hadwiger, North Andover, MA (US); Paul D. Krivacek, Cambridge, MA (US); Jørn Sørensen, Aars (DK); Palle Birk, Gistrup (DK)

(73) Assignee: Analog Devices, Inc., Norwood, MA (US)

(*) Notice: Subject to any disclaimer, the term of this patent is extended or adjusted under 35 U.S.C. 154(b) by 0 days.

(21) Appl. No.: 10/659,533

(22) Filed: Sep. 10, 2003

(65) Prior Publication Data

US 2004/0049293 A1 Mar. 11, 2004

Related U.S. Application Data

(62) Division of application No. 09/706,577, filed on Nov. 3, 2000, now Pat. No. 6,738,845.
(60) Provisional application No. 60/163,816, filed on Nov. 5, 1999.

(51) Int. Cl.[7] .............................................. G06F 13/00
(52) U.S. Cl. ........................ 710/111; 710/111; 710/116
(58) Field of Search ................................ 710/111, 116, 710/260, 263, 264, 265, 266, 113, 244, 48

(56) References Cited

U.S. PATENT DOCUMENTS

| | | | |
|---|---|---|---|
| 4,276,594 A | | 6/1981 | Morley |
| 4,326,249 A | * | 4/1982 | Godsey .......................... 710/48 |
| 4,381,542 A | * | 4/1983 | Binder et al. ................ 710/264 |
| 4,639,910 A | | 1/1987 | Toegel et al. |
| 4,698,753 A | | 10/1987 | Hubbins et al. |
| 4,914,580 A | * | 4/1990 | Jensen et al. ................ 710/265 |
| 4,994,960 A | * | 2/1991 | Tuchler et al. ............... 710/269 |
| 5,072,365 A | * | 12/1991 | Burgess et al. .............. 710/264 |
| 5,278,974 A | | 1/1994 | Lemmon et al. |
| 5,467,295 A | | 11/1995 | Young et al. |
| 5,519,837 A | * | 5/1996 | Tran ............................ 710/111 |

(Continued)

FOREIGN PATENT DOCUMENTS

| | | |
|---|---|---|
| EP | 0426413 A2 | 5/1991 |
| EP | 0702307 A1 | 3/1996 |
| EP | 09424623 A2 | 6/1999 |
| WO | WO 9926155 A1 | 5/1999 |

OTHER PUBLICATIONS

Morris Mano, "Computer System Architecture", 1982, Prentice–Hall, Inc., vol. 2, pp434–440.*

Lou R. Rohan and Douglas R. Taube, "Weighted Round-Robin Scheduling Module", Washington University in Saint Louis, http://www.arl.wustl.edu/~lockwood/class/cs535/project/fairqueue.*

*Primary Examiner*—Tim Vo
*Assistant Examiner*—Justin I. King
(74) *Attorney, Agent, or Firm*—Wolf, Greenfield & Sacks, P.C.

(57) ABSTRACT

A multiple bus architecture includes multiple processors, and one or more shared peripherals such as memory. The architecture includes plural bus masters, each connected to its own bus. There are also plural bus slaves, each connected to its own bus. A bus arbitration module selectively interconnects the buses, so that when the plural bus masters each access a different bus slave, no blocking occurs, and when the plural bus masers each access a same bus slave, bandwidth starvation is avoided. The architecture is supported by a bus arbitration method including hierarchical application of an interrupt-based method, an assigned slot rotation method and a round-robin method, which avoids both bandwidth starvation and lockout during extended periods of bus contention.

7 Claims, 3 Drawing Sheets

U.S. PATENT DOCUMENTS

| | | | |
|---|---|---|---|
| 5,539,882 A | | 7/1996 | Gopal et al. |
| 5,564,062 A | * | 10/1996 | Meaney et al. ............. 710/244 |
| 5,572,686 A | * | 11/1996 | Nunziata et al. ............ 710/116 |
| 5,627,976 A | | 5/1997 | McFarland et al. |
| 5,634,004 A | | 5/1997 | Gopinath et al. |
| 5,649,209 A | | 7/1997 | Umetsu et al. |
| 5,649,233 A | | 7/1997 | Chen |
| 5,729,702 A | * | 3/1998 | Creedon et al. ............ 710/111 |
| 5,734,848 A | | 3/1998 | Gates et al. |
| 5,832,278 A | * | 11/1998 | Pham ........................ 710/243 |
| 5,845,096 A | * | 12/1998 | Munguia et al. ............ 710/113 |
| 5,909,559 A | | 6/1999 | So |
| 5,931,931 A | | 8/1999 | Nguyen |
| 5,987,549 A | | 11/1999 | Hagersten et al. |
| 6,006,303 A | | 12/1999 | Barnaby et al. |
| 6,026,461 A | | 2/2000 | Baxter et al. |
| 6,038,630 A | | 3/2000 | Foster et al. |
| 6,047,349 A | | 4/2000 | Klein |
| 6,061,361 A | | 5/2000 | An et al. |
| 6,070,205 A | | 5/2000 | Kato et al. |
| 6,073,132 A | * | 6/2000 | Gehman ........................ 707/9 |
| 6,311,249 B1 | * | 10/2001 | Min et al. ................... 710/111 |
| 6,347,294 B1 | | 2/2002 | Booker |
| 6,389,493 B1 | | 5/2002 | Barkley et al. |
| 6,401,154 B1 | * | 6/2002 | Chiu et al. .................. 710/260 |
| 6,470,407 B1 | * | 10/2002 | Losi ........................... 710/264 |
| 6,496,740 B1 | | 12/2002 | Robertson et al. |

\* cited by examiner

BUS ARBITRATION METHOD EMPLOYING A TABLE OF SLOTS SUITABLY DISTRIBUTED AMONGST BUS MASTERS

This application is a divisional of prior application Ser. No. 09/706,577, filed on Nov. 3, 2000 now U.S. Pat. No. 6,738,845, entitled "Bus Architecture And Shared Bus Arbitration Method For A Communication Processor" and now pending; which, in turn, claims the benefit under 35 U.S.C. §119(e) of the filing date of provisional application Ser. No. 60/163,816, filed Nov. 5, 1999, now abandoned.

BACKGROUND

1. Field of the Invention

The present invention relates generally to small multiple processor systems, such as mobile phones having a control processor and a signal processor. The invention relates more specifically to systems in which one or more of the processors executes a software program or sequence of steps, which can be altered, modified or upgraded from time to time.

2. Related Art

Communications equipment, such as mobile phones performs a variety of signal and data processing functions. In older systems, a digital signal processor (DSP) processed digitized audio signals and a microprocessor control unit (MCU) controlled general system operations including communication set-up and tear-down for an individual equipment unit (e.g., phone). The DSP and the MCU of the simplest conventional systems communicate with each other through single-port and multi-port shared memory, control signals, etc. However, additional features and control options are possible when the DSP and MCU are permitted to communicate with each other, for example through a shared memory. Although systems wherein the DSP and the MCU do not communicate with each other are possible, the evolution of cellular communications to include support for digital data communications as well as audio communications has led to a greater need for the DSP and MCU to communicate with each other.

Communication standards also have been evolving and continue to evolve. Standards are often designed to be extensible, or new features cleverly designed to be backward compatible with an existing standard, so that the new features can be deployed to the field without the need to replace every piece of equipment already in the field. In order to accommodate such evolution, there is great pressure to move away from read-only memory (ROM) resident software or firmware to execute on the DSP or MCU. Modifying ROM resident software or firmware is difficult because generally ROM cannot be written to, except once at the time of manufacture.

Ultimately, the above-described pressures have resulted in the development of integrated circuits including a DSP, MCU, ROM and RAM. The monetary and size costs of adding RAM to integrated circuit systems have forced the DSP and MCU to share RAM whenever possible. In order to facilitate communication between the DSP and the MCU, and in order to avoid wasting any memory space, which, as noted, is at a premium, they share RAM. System software is loaded into RAM in order to maximize flexibility and the ability to reconfigure systems to stay in conformance with evolving communication standards. However, when memory is shared, for example using the architecture illustrated in FIG. 1, the memory access bandwidth becomes a serious problem.

SUMMARY OF THE INVENTION

It is a general object of the present invention to provide an improved bus architecture, especially, although not exclusively, for a communication processor. In meeting the need for an improved bus architecture, the inventors have further discovered a need for a new bus arbitration method.

According to one aspect of the invention, an integrated circuit comprises a first data processing subsystem including a first processor connected to a first bus as a bus master; a second data processing subsystem including a second processor connected to a second bus as a bus master; a first slave subsystem including a memory unit, usable by either of the first and second processors, connected to a third bus; a second slave subsystem usable by either of the first and second processors, including a fourth bus; and the first, second, third and fourth buses selectively connected to each other through a bus arbitration module arranged to connect the first and second bus masters to the first and second slave subsystems without blocking.

Several variants on this aspect of the invention are possible. For example, the first slave subsystem may include a shared memory connected to the third bus and shared by the first processor through the third bus. There may also be a local memory connected to the first processor, which communicates directly with the local memory. The circuit may also include a direct memory access (DMA) controller and a DMA bus connected to the third bus and the fourth bus, whereby data can be moved between the first slave subsystem and the second slave subsystem without intervention by the first processor or the second processor. There may further be a memory access interface (MAI) connecting one of the third and fourth buses to the local memory. The fourth bus may include a connection to an external device, which may be a memory device.

According to another aspect of the invention, an integrated circuit comprises: a data communications device, comprising a communications system having a first internal bus, a supervision and control system having a second internal bus; a first slave device system having a third internal bus; a second slave device system having a fourth internal bus; a direct memory access (DMA) system having a fifth internal bus; and the first, the second, the third, the fourth and the fifth internal buses interconnected through a bus arbitration module (BAM). According to this aspect of the invention, the integrated circuit may further comprise system memory accessed by both the data communications system and the supervision and control system through the BAM and the third internal bus.

The device may be configured so the DMA system communicates data directly between the system memory and the second slave devices system. The second slave devices system may include system support elements, communication support elements and input/output (I/O) elements. The system support elements may include an interrupt controller, the communication support elements and the I/O elements may include a generic serial port. The communication system may include a digital signal processor (DSP), while the supervision and control system may include a microprocessor control unit (MCU). The DSP and MCU may each communicate with an internal device over the first and second internal buses and also with the system memory through the BAM and the third internal bus. The fourth bus may include a connection to an external device, which may be a memory device.

In an aspect of the invention related to telecommunications systems, an integrated circuit device used in a telephone handset, the device may comprise in one integrated circuit a DSP, an MCU, a shared system memory, a DSP bus to which the DSP is connected, an MCU bus to which the MCU is connected, a peripheral unit and a peripheral bus to which the peripheral unit is connected, a memory bus to which the shared system memory is connected, and a BAM which selectively connects the DSP bus and the MCU bus to the memory bus and the peripheral bus, wherein when the DSP and the MCU request access to different buses, access occurs without blocking. In a variation, the device may further comprise a DMA controller and a DMA bus controlled by the DMA controller wherein the BAM further selectively connects the DMA bus between the memory bus and the peripheral bus. The peripheral unit system may also include one or more support elements, including system support elements, communication support elements and I/O support elements. In these variations, the DSP and MCU may each communicate with a local device over the DSP and MCU local bus, respectively, and also communicate with the system memory through the BAM and the memory bus. There may also be an external bus including a connection to an external device, such as a memory device.

According to further aspects of the invention, there are methods of prioritizing and granting bus access requests. A method of prioritizing and granting bus access requests may comprise granting the bus access request of a requestor asserting a high priority interrupt if no requestor is asserting the high priority interrupt, granting the bus access request of a requester owning the current request slot. According to the method, access may be granted to a processor operating on a real-time signal when the processor has been in a wait state for a time-out period. The time-out period may be programmable. The indication that the processor has been in the wait state longer than the time-out period may be assertion of a high priority interrupt. When the request is granted to the owner of the current request slot, the table of request slot owners may be updated. When the request is granted to the highest entry on the round robin list, both the round robin list and the table of request slot owners may be updated.

According to a further aspect of the invention, there may be a programmable device, comprising plural master buses; plural bus masters, each connected to a corresponding one of the plural master buses; plural slave buses; plural resources used by a first one and a second one of the plural bus masters, each of the plural resources connected to a corresponding one of the plural slave buses; and a BAM interconnecting the plural master buses and the plural slave buses, the bus arbitration module guaranteeing allocation to each of the plural bus masters at least a predetermined number of units of bandwidth for access to the plural resources and that reallocates from a first bus master to which an unneeded unit of bandwidth has been allocated to a second bus master which needs a unit of bandwidth. In such a device, the resource may further comprise a memory used by at least the first one and the second one of the plural bus masters. The BAM may further comprise a DMA bus selectively interconnecting two of the plural slave buses. The plural resources may include one or more support elements, including system support elements and as an interrupt controller, communication support elements such as GSM communication support elements and I/O support elements such as a generic serial port. The first bus master may further comprise a DSP. The second bus master may further comprise an MCU. The device may further include an external slave bus including a connection to an external device, which may be a memory device.

BRIEF DESCRIPTION OF THE DRAWINGS

In the drawings in which like reference designations indicate like elements.

DETAILED DESCRIPTION

The present invention will be better understood upon reading the following detailed description of some exemplary embodiments thereof.

Figure 1:
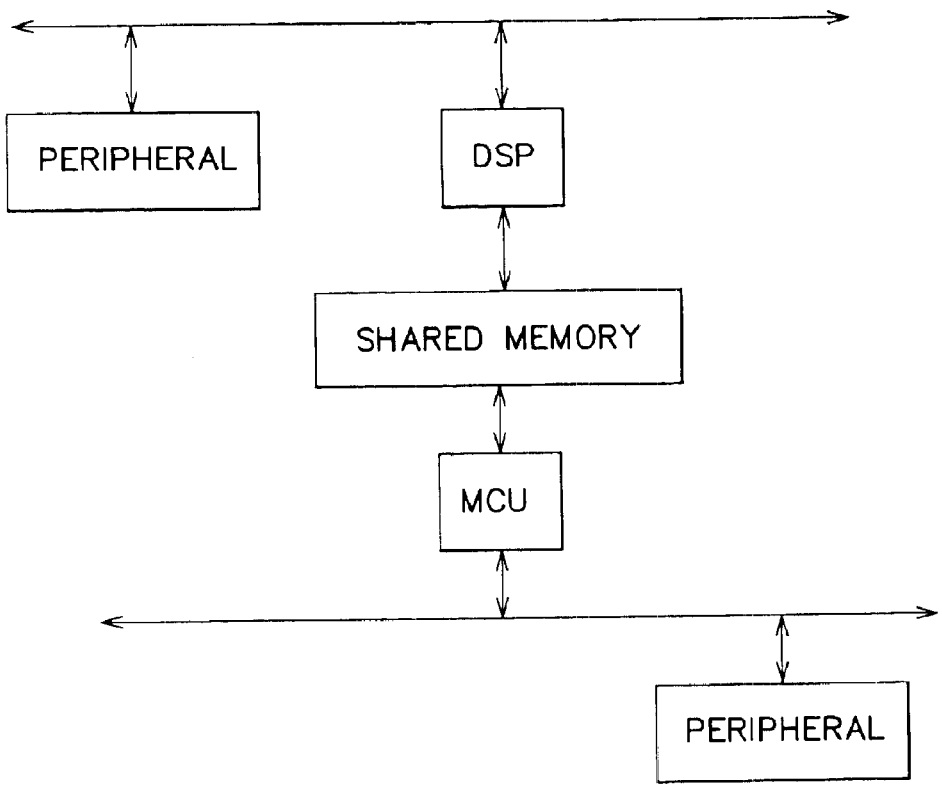
FIG. 1 is a schematic block diagram of conventional bus architecture including a shared memory.
Figure 2:
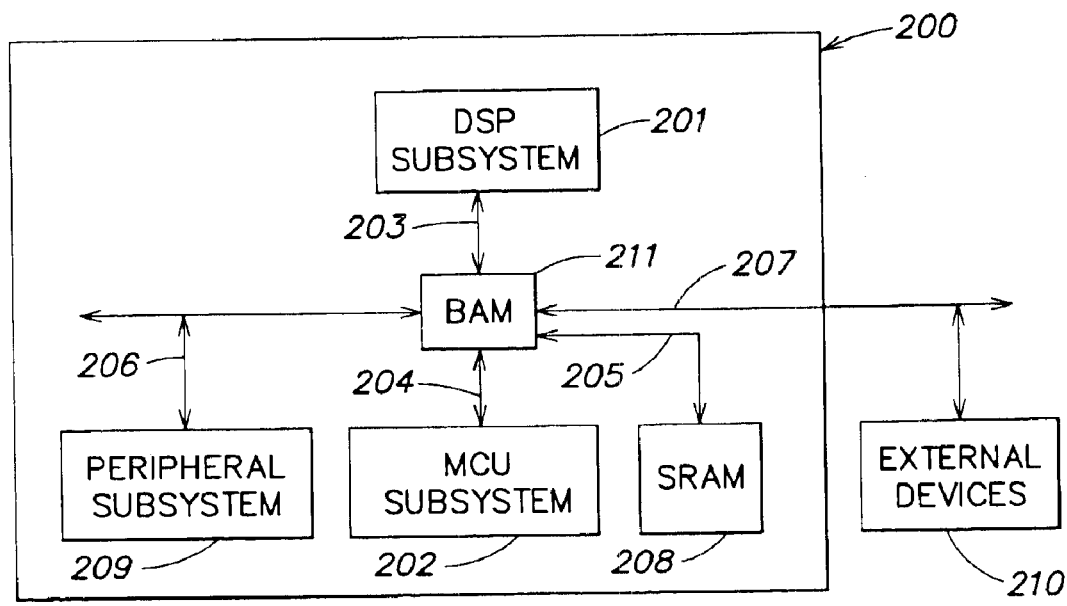
FIG. 2 is a simplified schematic block diagram of an exemplary bus architecture embodying aspects of the present invention.

An overview of the architecture of one exemplary embodiment of aspects of the present invention is now given in connection with FIG. 2.

When in the following discussion, a bus is mentioned, a set of signal paths connecting the functional units of the circuit, system or device under discussion is meant. A bus may include an addressing component and a data carrying component, each sometimes individually referred to as a bus. Most commonly, buses are configured to have two or more parallel signal paths carrying multi-bit wide data and address information, although serial buses are also known.

FIG. 2 depicts a device 200, for example implemented as an integrated circuit. The device includes a digital signal processor (DSP) subsystem 201 and a micro-controller unit (MCU) subsystem 202. Within DSP subsystem 201 is a local bus (not shown) to which a processor is connected. A bus 203 provides an external (to the DSP subsystem 201) connection to the DSP subsystem 201 for other elements of the device 200; bus 203 may also be the local bus within DSP subsystem 201. Similarly, MCU subsystem 202 includes a local bus, the MCU bus 204, which provides an external (to the MCU subsystem 202) connection of the MCU subsystem 202 to other elements of the device 200. Each of the subsystems 201 and 202 discussed thus far includes a processor, thus providing the device 200 with plural processors. In order to improve the performance of each processor, it has been given its own subsystem (201, 202), together with its own local bus (203, 204, respectively). These will be discussed in greater detail, below. As noted above, the DSP subsystem 201 and MCU subsystem 202 include a DSP (discussed below) and an MCU (discussed below), respectively. Each of the DSP and MCU is a bus master, meaning each can request access through its respective local bus to other elements of the device 200. Each can also include plural internal buses, if design requirements are better met by such a structure.

Device 200 further includes three other buses 205, 206 and 207 to which various additional elements are connected. The other elements of the device 200 are bus slaves, which respond to requests for access from the bus masters. Memory, for example static random access memory (SRAM) which may be used as a shared system memory, is connected to bus 205. Various peripheral devices by which device 200 can perform its necessary functions are contained in a peripheral subsystem 209 connected to a peripheral bus 206. Finally, external devices 210, such as flash ROM, for example, are connected to an external bus 207. The partitioning of functions among the various devices and buses mentioned above preferably is optimized by the designer for any particular purpose. In the embodiment presently described, various optimization choices have been made to render device 200 suitable for use as the heart of wireless mobile communications devices, such as a Global System for Mobile communications (GSM) telephone, a telephone supporting another communication protocol such as Code Division Multiple Access (CDMA), or devices supporting the Wireless Application Protocol (WAP).

The buses 203, 204, 205, 206 and 207 described above are interconnected through a bus arbitration module (BAM) 211 including a Direct Memory Access (DMA) subsystem (not shown). The configuration and operation of the BAM 211 is described in greater detail, below. That configuration and operation determines which buses can communicate with each other and at what times. The design and operation of the BAM 211 is optimized to guarantee a configurable minimum access bandwidth by the DSP subsystem 201 and the MCU subsystem 202 to any of the other system elements required, and to prevent one subsystem 201, 202 from locking out the other subsystem 201, 202.

In the illustrative embodiment of device 200, all bus masters, including DSP subsystem 201 and MCU subsystem 202, employ a common, unified address space. A number of important advantages can be obtained by use of a unified address space. For example, DSP subsystem 201 and MCU subsystem 202 can exchange data or code in SRAM 208 merely by passing a pointer to the data or code to be exchanged, by writing the pointer to a globally known location. According to another advantage of a unified address space, the logic required for address decoding in the BAM 211 is greatly simplified because the same decoding is required regardless of which bus master or bus slave is involved in a particular transaction. According to yet another advantage of the unified address space, a very symmetrical system is achieved. Since both the DSP and MCU use the same address space, code can be more easily ported from one device to the other. Therefore, the designer can better partition code between the DSP and MCU, avoiding critical path problems and processor overloading.

Figure 3:
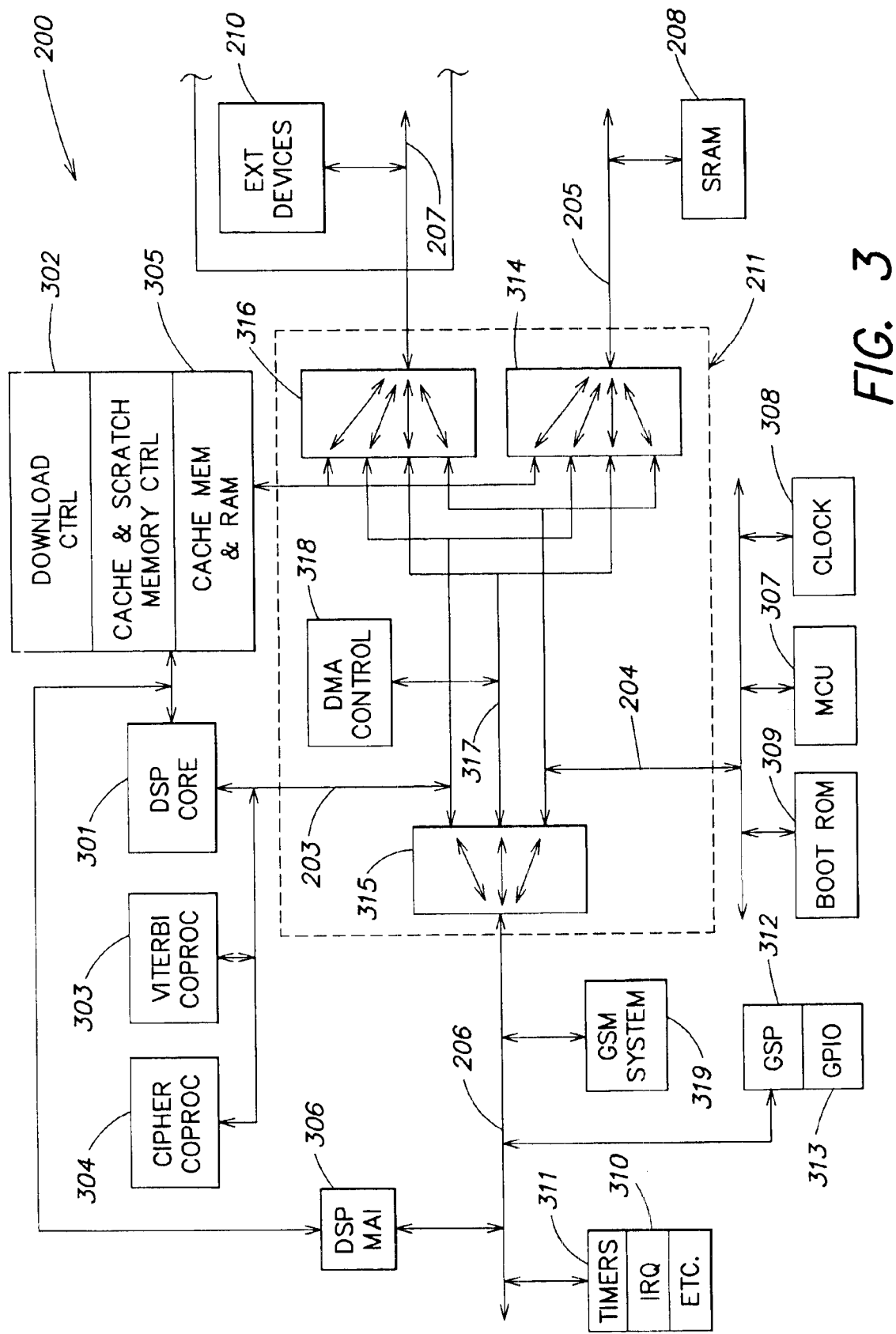
FIG. 3 is a more detailed block diagram of the bus architecture of FIG. 2.

The illustrative embodiment is now described in greater detail, in connection with FIG. 3. First, the DSP subsystem 201 is described.

At the heart of the DSP subsystem 201 is an Analog Devices 218X DSP core 301. Other types of DSP core 301 could be used, including those implemented as part of an MCU or other devices implementing DSP capabilities in hardware or software. Also included in the DSP subsystem 201 are a memory management system 302 including a download controller, cache and scratch memory controller and cache memory, and DSP-specific peripherals including a Viterbi co-processor 303 and a generic ciphering engine 304. The functionality of such DSP specific peripherals could be implemented in the DSP or external hardware and/or software.

Notably absent from the DSP subsystem 201 is an internal read only memory (ROM). Instead, DSP code is dynamically downloaded or cached into the DSP cache memory 305. By employing a cache memory 305, the downloading of DSP code occurs transparently to the user. By using conventional caching techniques, not all of the DSP code required for a particular function, for example a speech encoder, need be downloaded at any particular point in time. Rather, only those fragments needed immediately for use by the DSP need be downloaded, resulting in less memory being required within the DSP subsystem 201. Although the foregoing discussion demonstrates that the DSP subsystem 201 does not require an internal ROM, one could be included if desired, without departing from the spirit of the invention.

DSP code can be loaded into the cache from either internal system memory 208 or from an external memory, for example flash ROM connected as an external device 210 to bus 207. Taking advantage of such flexibility minimizes conflicts between the DSP subsystem 201 and the MCU subsystem 202 with respect to memory access. Critical code should be placed where the minimum overhead and latency will be imposed during actual system operation.

For maximum flexibility with respect to software partitioning, all bus systems 204, 205, 206 and 207 are accessible by the DSP subsystem 201 through DSP bus 203 and BAM 211.

The DSP subsystem 201 also has some internal static RAM 305, which can be used for code having critical timing requirements and for data. The internal static RAM 305 of the DSP 301 is also accessible to the MCU subsystem 202 via a memory access interface (MAI) module 306 connected to the peripheral bus 206.

The MCU subsystem 202 includes an ARM7TDMI MCU core 307 (from ARM Ltd. of the United Kingdom) or other suitable MCU access. The MCU subsystem 202 further includes clock generation circuits 308 and a small ROM 309 containing bootstrap code for loading externally stored software.

The memory 208 of the illustrative embodiment is an internal static RAM (SRAM) for storing data and code. It is accessible to both the DSP subsystem 201 and the MCU subsystem 202 through their respective buses 203 and 204, when connected to the memory bus 205 through the BAM 211. Time critical MCU subsystem code can be placed in this memory, to separate it from the time critical code for the DSP subsystem. Less time critical DSP code can be also stored in static RAM 208.

The peripheral subsystem 209 includes a generic interrupt controller 310, a generic timer 311, a generic serial port 312, a general purpose input/output (GPIO) port 313 and a GSM I/O system 314. The generic interrupt controller 310 collects all of the interrupts received by the system, groups them together in software configurable groups and assigns them a priority level. Thus, a fully programmable interrupt priority scheme is implemented. In the illustrative embodiment, three independent interrupt controllers (not shown) also exist, one for each of the DSP subsystem 201, the MCU subsystem 202 and internally to the BAM 211. The generic timer module 311 is a fully software configurable timer module, used to maintain system timing. The timer module can generate interrupts and set or clear external connections to the device 200. The generic serial port 312 is a fully software programmable sequencer with specific hardware for implementing serial port standards. The generic serial port 312 can be programmed to serve most known serial standards. Thus, each user of device 200 can create unique hardware specific serial interfaces without modifying any of the internal structures of device 200. The GPIO 313 functionality allows various external connections to device 200 to be used for any particular unique hardware or software specific interface requirements.

The external bus 207 provides a high-speed connection to the device 200 suitable for connecting elements such as flash ROM, requiring a parallel interface.

As described above, all of the buses 203, 204, 205, 206 and 207 are interconnected through the bus arbitration module (BAM) 211. The bus arbitration module includes three arbitration units 314, 315 and 316 and a direct memory access (DMA) subsystem including a DMA bus 317 and DMA controller 318 described below. As will be described below, in part by having a separate arbitration unit for each slave bus, the BAM 211 is constructed and arranged to avoid blocking when multiple bus masters each request access to resources connected to the different slave buses.

The three bus arbitration units 314, 315 and 316 each correspond to one of the three principal system buses, the memory bus 205, the peripheral bus 206 and the external bus 207, respectively. The three arbitration units 314, 315 and 316 are structurally identical (the arbitration methods can be different), but are each dedicated to their own bus 205, 206 and 207.

One arbitration unit 314 selectively connects the memory bus 205 to one of the DSP bus 203, the MCU bus 204, the DMA bus (discussed below) or the DSP cache.

A second arbitration unit 315 selectively connects the peripheral bus 206 to one of the DSP bus 203, the MCU bus 204 and the DMA bus (discussed below).

A third arbitration unit 316 selectively connects the external bus 207 to one of the DSP bus 203, the MCU bus 204, the DMA (discussed below) and the DSP cache.

It should be evident that the structure illustrated in FIG. 3 is non-blocking, as now discussed. Bus masters, e.g., DSP core 301 and MCU 307, are each connected to their own bus. Local communication by a bus master on its own bus in completely independent of local communication by another bus master on its own bus. Resources, i.e., bus slaves, are distributed among plural slave buses, e.g., buses 205, 206, 207. If one bus master requests access to a resource on one slave bus and another bus master requests access to another resource on another slave bus, no blocking occurs because independent arbitration units handle the separate requests. Thus, the designer can optimize the design by separating shared resources according to which bus master is the primary user of the resource. Other non-blocking structures are possible, using, for example a multi-port, non-blocking parallel switch structure can be used.

The separation of shared resources can be done as follows. If the DSP core 301 uses a first resource more than the MCU 307, but the MCU 307 uses a second resource more than the DSP core 301, then the first and second resources should be attached to different slave buses.

Each arbitration unit 314, 315, 316 grants access to its bus 205, 206, 207 according to the method described below. An active bus select signal from a requestor to the arbitration unit 314, 315, 316 indicates a request for access and arbitration. The arbitration unit 314, 315, 316 either returns a wait signal for delaying access or grants the access. When the bus select signal of a requester granted access becomes inactive, it indicates to the arbitration unit that the next arbitration cycle can start.

To maximize the performance of the device 200, the DSP cache access can be performed in a block mode, reading (for example) up to 12 words at a time. In the illustrative embodiment, words are 16 bits long, however other lengths can be used as required by particular bus designs as known in the art. Thus full advantage can be taken of the bandwidth provided by, for example, flash ROM, connected as an external device 210 to the external bus 207. The method of arbitration is discussed in greater detail, below.

The DMA subsystem of the bus arbitration module includes a DMA bus 317 and a multi-channel DMA controller 318. In the illustrative embodiment a 16 channel DMA controller 318 is used. The DMA controller 318 is a bus master, like the DSP core 301 and MCU 307. The DMA bus 317 interconnects the three arbitration units 314, 315, 316, so that a DMA can be performed between devices connected to any of the three buses, the memory bus 205, the peripheral bus 206 and the external bus 207. Data or code can be transferred from any address location on one of the three buses 205, 206 and 207 to any address location on another of the three buses 205, 206 and 207. The DMA controller 318 includes one word of transfer memory which is the memory used to perform the transfer mentioned above and described in detail below. The DMA controller 318 also includes other memory used for purposes known in the art. Other memory sizes could be used, if desired for a particular purpose. The DMA controller 318 reads in one word from a source location during a first memory cycle then writes the word out to a destination location during a second, subsequent memory cycle.

The DMA controller 318 governs the operation of the DMA bus 317. The DMA controller 318 handles data transfers for both interrupt-driven I/O devices and for memory devices. The DMA controller 318 includes separate full duplex channels with identical functionality. Each channel is controlled and configured by either the MCU subsystem 202 or the DSP subsystem 201 through the peripheral bus 206. After the DMA controller 318 transfers a programmable number of address locations, it gives an interrupt to the interrupt controller 310.

The DMA controller 318 can perform the following tasks, giving additional functionality to the system. A RAM buffer can be created between an I/O device and, for example, the MCU subsystem 202. Thus, the number of interrupts required to handle I/O data can be reduced. In such an instance, the DMA controller transfers a block of a predetermined or programmable number of words of data between a memory module, such as SRAM 208 and the I/O peripheral within the peripheral subsystem 209. The DMA controller can move a block of data, such as a table or program, from a flash ROM, among the external devices 210, to the internal DSP subsystem data memory, program memory or cache. Finally, the DMA controller can effect the copying of any large memory blocks from one location to another in the system, as may be required.

Figure 4:
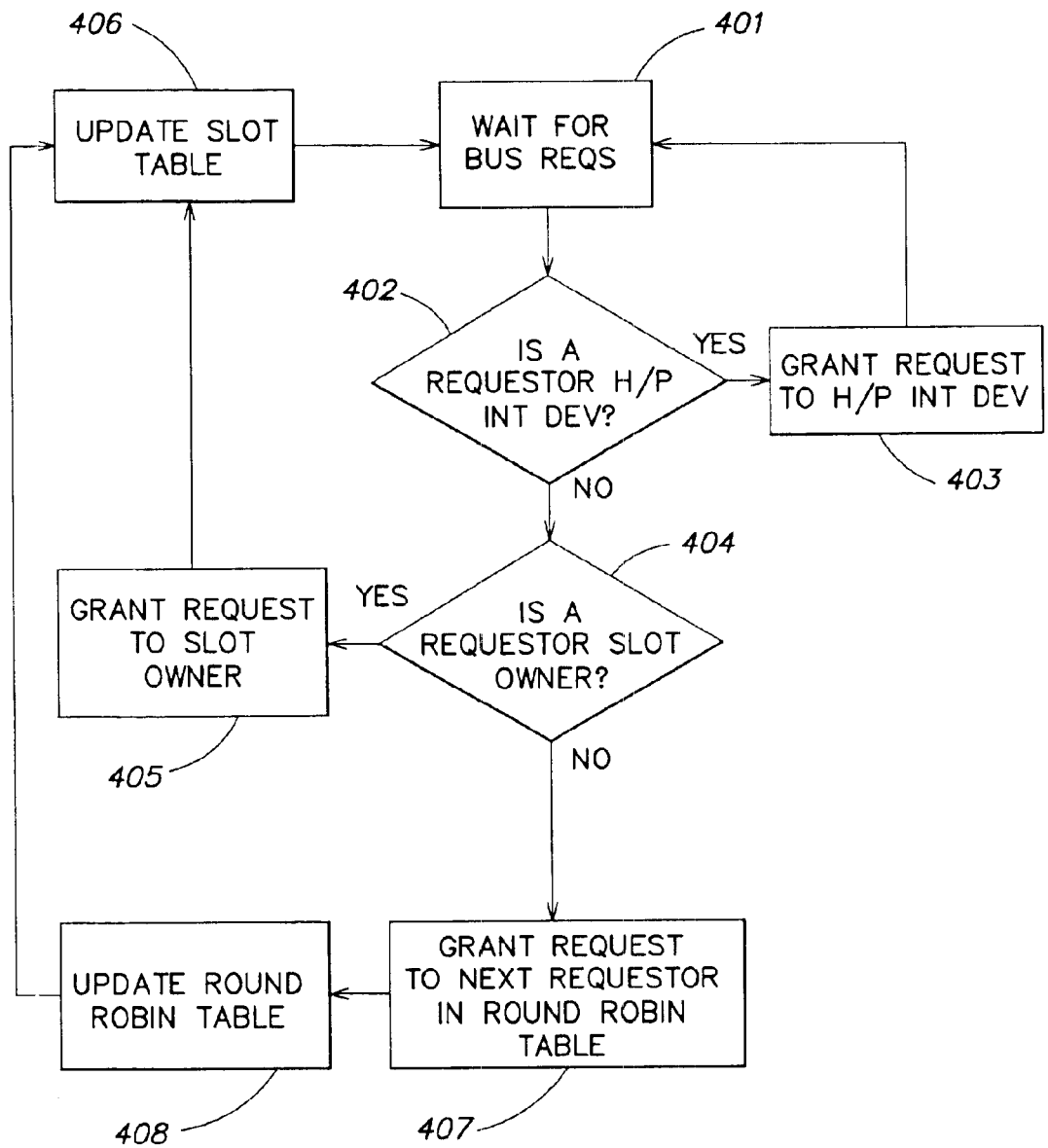
FIG. 4 is a flowchart of an exemplary arbitration method embodying aspects of the invention.

Next, the arbitration method of the illustrative embodiment is discussed in connection with FIG. 4. In the illustrative device 200, the DSP subsystem 201, the MCU subsystem 202 and the DMA controller 318 are bus masters.

According to one simple arbitration method, each device has a unique priority level assigned. In such a system, the highest priority device requesting access to a bus is always given access. However, such a scheme can result in bandwidth starvation of lower priority devices, if the higher priority devices constantly demand access. Another common arbitration method is the round-robin arbitration method in which each device is given a priority, which depends, upon the placement of the device on a rotating list. The requesting device at the highest position on the list receives the access requested. Typically, the top device on the priority list is then moved to the bottom of the list. Neither of these conventional methods satisfies all the requirements of the device described herein.

Since the bandwidth requirements of the peripheral subsystem 209 are not very high,.arbitration for the peripheral bus 206 is performed by the round-robin method. It can be assumed that there are no back-to-back requests by one bus master for the peripheral bus.

With respect to the external bus 207 and the memory bus 205, the expected bandwidth requirements of the DSP bus 203, the MCU bus 204 and DMA bus 317 must be taken into account. A round robin-table is combined with a fixed table having 15 programmable slots. Depending upon the relative bandwidth requirements of the DSP subsystem 201, MCU subsystem 202 and DMA controller 318, the 15 slots are distributed suitably among the three bus masters.

The resulting composite arbitration method is performed as follows. The arbitration units (FIG. 3, 314, 315, 316) wait for bus requests to arrive, 401. Then the arbitration unit checks for high priority interrupts, 405. For example, if the DSP subsystem 201 has been placed into a wait state, it cannot handle the serial ports, which it is required to process. Therefore, if such a wait state of the DSP subsystem 201 occurs, a high priority interrupt is issued. When such a high priority interrupt occurs-and is detected, 402 access is granted to the bus master responsible for the high priority interrupt having been issued, 403. After the access is complete, the arbitration unit resumes waiting for bus requests, 401. Next, a determination is made by reference to the fixed table of programmable slots as to whether one of the requesters is the current owner of the access slot, 404. If so, at 405, access is granted to the current slot owner and the slot table is updated so the slot owner is now the next bus master listed therein, 406. If the current slot owner is not one of the requesters, 404, then the request is granted in accordance with the current state of the round robin table, 407. The round-robin table is then updated, 408, as is the slot owner table, 406.

Substantial portions of the arbitration method described are performed asynchronously, for example by asynchronous logic. By using asynchronous processes, the arbitration method processes bus requests immediately, without losing bus cycles. Only the updates 406, 408 are performed on a clock cycle basis. The updates, 406, 408 occur on the clock cycle in which a bus access is granted.

It is possible to have multiple devices capable of generating high priority interrupts in such an arbitration method, but an ancillary prioritization must be made between them in the case where two or more high priority interrupts are simultaneously detected.

The present invention has now been described in connection with a number of specific embodiments thereof. However, numerous modifications, which are contemplated as falling within the scope of the present invention, should now be apparent to those skilled in the art. Therefore, it is intended that the scope of the present invention be limited only by the scope of the claims appended hereto.

What is claimed is:

1. A method of prioritizing and granting bus access requests in a system that comprises a table of slots assigned to bus masters, wherein the table has a number of slots and one of the slots serves as an access slot, and wherein at least one of the bus masters is assigned to multiple slots in the table, the method comprising:

(a) granting a bus access request of a bus master asserting a high priority interrupt;

(b) if no bus master is asserting a high priority interrupt, determining whether a bus master making a bus access request is currently assigned to the access slot in the table, and granting the bus access request of that bus master if it is determined that the bus master is currently assigned to the access slot in the table; and (c) if no bus master is asserting the high priority interrupt and no bus master making an access request is assigned to the access slot, granting a bus access request of a bus master highest on a round robin priority list.

2. The method of claim 1, wherein the step (a) further comprises:

generating the high priority interrupt for a processor operating on a real-time signal when the processor has been in a wait state for a time-out period.

3. The method of claim 2, wherein the time-out period is programmable.

4. The method of claim 2, wherein a first bus master is assigned more slots in the table than a second bus master.

5. The method of claim 2, wherein the step (b) further comprises:

if the bus access request of a bus master assigned the access slot is granted, updating the table so that a different one of the bus master entries in the table is assigned to the access slot.

6. The method of claim 5, further comprising:

if the bus access request of a bus master highest on the round robin priority list is granted, updating the round robin priority list and also updating the table so that a different one of the bus master entries in the table is assigned to the access slot.

7. The method of claim 5, further comprising a step of:

assigning a number of slots in the table to each bus master based upon the relative bandwidth requirements of the bus masters.

* * * * *